Patented Jan. 1, 1946

2,392,163

UNITED STATES PATENT OFFICE 2,392,163

MOLDING POWDER AND PROCESS OF MAKING THE SAME

Harry F. Lewis, Appleton, Wis., assignor, by mesne assignments, to The Pacific Lumber Company, San Francisco, Calif., a corporation of Maine No Drawing. Application July 21, 1941, Serial No. 403,254

8 Claims. (Cl. 106—123)

The present invention relates to molding powders and the method of making the same.

The principal object of the present invention is to provide improved molding powder.

Another object of the present invention is to provide methods of making improved molding powder.

A more specific object of the present invention is to provide improved molding powders containing unique resinous compositions including tannin modified by the process herein described.

Other objects of the present invention will be apparent as the description hereinafter proceeds.

Heretofore, it has been proposed to form molding compositions by a steam pressure treatment of hard woods. According to the prior treatments the woods are subjected to relatively high temperatures or pressures for relatively long periods of time and the treated material thus obtained subjected to a special washing step in order to remove hard wood "water-solubles," the presence of which were found undesirable for molding purposes. Losses up to 40 per cent based on the weight of the dry wood were frequently encountered in obtaining the final products by the prior treatments.

The products obtained by the above mentioned prior processes (although satisfactory for producing certain types of molded articles) were also found to be of limited utility. They were found, for example, not to be satisfactory for conversion into molding powders or compositions for subsequent use in complicated molds where a considerable amount of flow is required.

After prolonged research investigation I discovered a method of treating tannin containing woods such as western red cedar, quebracho, chestnut, oak, etc., resulting in the preparation of improved molding powders having very satisfactory flow and other molding characteristics. The new method at the same time employs relatively low temperatures and pressures coupled with shorter periods of treatment than has been the case in prior treatments of a similar type. In addition, according to the present invention, losses are substantially reduced for in the new method the black cooking liquor containing the "water-solubles" is used and the compositions therein are an essential part of the molding powder. The retention of water-soluble compositions (ordinarily wasted to the sewer in the prior methods of treatment) has been found necessary for the formation of a satisfactory product prepared in accordance with the present invention.

Investigations show that the tannin woods of the present invention behave differently than tannin-free woods when subjected to the process of the present invention and that these differences in action which result in different type products are due primarily to the presence of special type tannins. These tannins are modified, i. e. undergo a chemical change, during the steam treatment hereinafter described, and in their modified form are essential constituents of the products of the present invention.

In accordance with the present invention I prefer to treat the wood chips, sawdust or the like in accordance with the general process of Mason Patent No. 1,824,221, September 22, 1931; employing the digester or gun for disintegration of the fibrous material therein described. The heat treatment carried out in the steam digester should preferably be at about 600 pounds per square inch pressure for a period of about 10 to 20 seconds.

After the completion of the heat treatment the material is discharged from the digester, the change from high pressure to low pressure (e. g. atmospheric) resulting in an explosive disintegration of the wood material. The solid material together with the cooking liquor is then dried, e. g. air drying. The dry material obtained may be ground to molding powder or, if desired, may be left in its fibrous condition.

While the steam pressure and period of treatment may be varied somewhat the use of relatively high pressures (e. g. 900 to 1000 pounds per square inch) and/or the use of relatively long periods of treatment (e. g. 50 seconds to 30 minutes) results in the formation of inferior molding powder. High pressures, for example, give a final product which is weak, sticks in the mold and has poor finish. For purposes of the present invention pressures of 500 to 800 pounds per square inch and periods of treatment of 8 to 20 seconds (the higher pressures requiring shorter periods of treatment and vice versa) may be employed. The product, however, having the best molding properties including flow, finish, strength, etc., is obtained by bringing the digester up to 600 pounds pressure (which requires about 30 seconds) and holding the pressure at 600 pounds for 10–15 seconds.

The product obtained by the present process is a thermosetting composition and is excellently suited for molding compositions. In addition to the woody material it contains as essential constituents tannins which have been modified into unique compositions of unknown structure by the heat and pressure treatment.

The products of the present invention have been found adaptable for use with other resinous or potentially resinous compositions. The following example will serve for illustrative purposes.

About 3-10% (preferably 5%) of extracted pine wood pitch is added to a batch of the air dried wood product described above. The mixture is mixed to form a homogeneous product preferably in a Banbury type mixer or rod mill and is then ready for molding directly. This particular molding powder is especially suited for use in intricate molds such as spool molds in which the molded products are used to wind wire, etc. The extracted pine wood pitch employed in this example is described in detail in U. S. Patent No. 2,115,496 of April 26, 1938. Specifically, it is a pine wood pitch, characterized by substantial insolubility in petroleum hydrocarbons and comprising a residue low in abietic acid remaining after the separation of refined rosin high in abietic acid from the resinous material obtained by extraction of pine wood.

The addition of about 5 per cent precipitated lignin to the wood products of the present invention also yields an excellent molding composition. A lignin product sold under the trade-mark "Meadol" and obtained from the black liquor of the soda process is a preferred addition agent.

It has been found that the process of the present invention increases alcoholic extractives. For example, the alcoholic extractives of a tannin wood of the present invention may change from 15 per cent before to 30-35 per cent after cooking. If desired, a molding composition may be made by cooking a tannin extract mixed with a pulp material such as flax straw. Ordinarily, however, the use of the tannin containing wood is preferred.

Tests with western red cedar treated in accordance with the present invention showed a tensile (A. S. T. M.) of about 5415 lbs./sq. in. Oak with a good flow and molding quality showed a tensile of about 4690 lbs./sq. in. Chestnut with a somewhat lower tensile showed high flow. The products of the present invention may be used in various mixtures as well as with the redwood tannin and phlobaphene products described in my co-pending application Serial No. 345,106. The tannin woods may be mixed together and treated or the woods may be treated separately and mixed together thereafter. The blending of the tannin woods including the redwoods makes various modifications possible in the molding powder as well as the molding products made therefrom.

It will be understood that the present invention is not limited to the above illustrative examples. All modifications falling within the scope of the present invention are intended to be covered by the claims annexed hereto.

I claim:

1. The process of making a molding ingredient which comprises subjecting a tannin wood to a heat treatment in the presence of steam at a pressure of 500 to 800 pounds per square inch for a period of 8 to 20 seconds, disintegrating the wood, drying the disintegrated wood with the cooking liquor formed by the steam treatment, and mixing the resulting dried mass to form a substantially homogeneous product.

2. A process of making a molding ingredient which comprises subjecting a tannin wood to a heat treatment in the presence of steam at a pressure of 600 pounds per square inch for a period of 10 to 15 seconds, disintegrating the wood, drying the disintegrated wood with the cooking liquor formed by the steam treatment, and mixing the resulting dried mass to form a substantially homogeneous product.

3. A process of making a molding ingredient containing as an essential constituent a heat and pressure modified tannin, which comprises subjecting oak chips, sawdust or the like containing a substantial portion of tannin to a heat treatment in the presence of steam and at a pressure of about 600 pounds per square inch for a period of about 10 to 15 seconds, disintegrating the oak wood, air drying the disintegrated wood with the cooking liquor resulting from the steam treatment, and subjecting the resulting dried mass to a mixing treatment to form a substantially homogeneous product.

4. A molding ingredient, a disintegrated tannin wood and resulting cooking liquor prepared by subjecting a tannin wood to a heat treatment in the presence of steam at a pressure of 500 to 800 pounds per square inch for a period of 8 to 20 seconds.

5. A molding ingredient containing as an essential constituent heat and pressure modified tannin and consisting of a mixture of disintegrated wood and cooking liquor prepared in accordance with the process of claim 2.

6. A molding powder containing about 5 per cent precipitated lignin obtained from the black liquor of the soda process and the remainder a molding ingredient prepared in accordance with the process of claim 2.

7. A molding ingredient comprising wood fibers disintegrated by explosive action with high-pressure steam; said wood originally containing tannin in significant amounts; said prepared ingredient still retaining substantially all the material present in the original wood, including chemical constituents soluble in water either before or after disintegration.

8. A molding powder containing about five per cent precipitated lignin obtained from the black liquor of the soda process, and the remainder a molding ingredient according to claim 7.

HARRY F. LEWIS.